United States Patent
Lin et al.

(10) Patent No.: US 9,041,310 B2
(45) Date of Patent: May 26, 2015

(54) LOAD DRIVING APPARATUS RELATED TO LIGHT EMITTING DIODES

(71) Applicant: Beyond Innovation Technology Co., Ltd., Taipei (TW)

(72) Inventors: Chiu-Yuan Lin, Taipei (TW); Chien-Pang Hung, Taipei (TW); Zhen-Chun Liu, Taipei (TW)

(73) Assignee: Beyond Innovation Technology Co., Ltd., Taipei (TW)

( * ) Notice: Subject to any disclaimer, the term of this patent is extended or adjusted under 35 U.S.C. 154(b) by 0 days.

(21) Appl. No.: 13/945,936

(22) Filed: Jul. 19, 2013

(65) Prior Publication Data

US 2014/0139111 A1 May 22, 2014

(30) Foreign Application Priority Data

Nov. 16, 2012 (TW) ............... 101142870 A (51) Int. Cl.
H05B 37/00 (2006.01)
H05B 33/08 (2006.01)

(52) U.S. Cl.
CPC ........... *H05B 33/0887* (2013.01); *Y02B 20/341* (2013.01)

(58) Field of Classification Search
CPC ..................................................... H05B 37/00
USPC .......... 315/312, 209, 291, 210, 287, 294, 247
See application file for complete search history.

(56) References Cited

U.S. PATENT DOCUMENTS

| | | | | |
|---|---|---|---|---|
| 7,144,494 | B2 * | 12/2006 | Bolz ........................ | 205/784.5 |
| 7,358,706 | B2 * | 4/2008 | Lys ........................... | 323/222 |
| 7,425,803 | B2 * | 9/2008 | Shao et al. ................. | 315/308 |
| 8,203,281 | B2 * | 6/2012 | Cegnar et al. .............. | 315/291 |
| 8,305,004 | B2 * | 11/2012 | Shao .......................... | 315/247 |
| 8,547,026 | B2 * | 10/2013 | Lin et al. .................... | 315/192 |
| 8,564,219 | B2 * | 10/2013 | Lee et al. ................... | 315/291 |
| 8,773,031 | B2 * | 7/2014 | Sadwick et al. ............ | 315/224 |
| 2003/0011538 | A1 * | 1/2003 | Lys et al. ..................... | 345/39 |
| 2006/0038503 | A1 * | 2/2006 | Hung ......................... | 315/224 |
| 2006/0087298 | A1 * | 4/2006 | Turchi ........................ | 323/265 |
| 2007/0188427 | A1 * | 8/2007 | Lys et al. ..................... | 345/82 |
| 2008/0012502 | A1 * | 1/2008 | Lys ............................. | 315/247 |
| 2008/0203946 | A1 * | 8/2008 | Ito et al. ..................... | 315/307 |

(Continued)

*Primary Examiner* — Douglas W Owens
*Assistant Examiner* — Wei Chan
(74) *Attorney, Agent, or Firm* — Jianq Chyun IP Office (57) ABSTRACT

A load driving apparatus related to light emitting diodes (LED) is provided. The load driving apparatus includes a power conversion circuit, a complex function circuit, and a control chip. The power conversion circuit receives a DC input voltage and provides a DC output voltage to at least one LED string in response to a gate pulse-width-modulation (PWM) signal. The complex function circuit is serially connected with the LED string and provides a short-protection mechanism. The control chip is coupled to the power conversion circuit and the complex function circuit. The control chip generates the gate PWM signal to control the operation of the power conversion circuit, and when the LED string is short-circuited, the control chip controls the complex function circuit to activate the short-protection mechanism, so as to protect the load driving apparatus from being damaged.

24 Claims, 6 Drawing Sheets

(56) References Cited

U.S. PATENT DOCUMENTS

| | | | |
|---|---|---|---|
| 2008/0238333 A1* | 10/2008 | Hong et al. | 315/276 |
| 2009/0033236 A1* | 2/2009 | Alexandrov | 315/224 |
| 2009/0315484 A1* | 12/2009 | Cegnar et al. | 315/307 |
| 2009/0322234 A1* | 12/2009 | Chen et al. | 315/159 |
| 2010/0164403 A1* | 7/2010 | Liu | 315/297 |
| 2010/0308733 A1* | 12/2010 | Shao | 315/119 |
| 2011/0037407 A1* | 2/2011 | Ahn et al. | 315/287 |
| 2014/0111113 A1* | 4/2014 | Del Carmen, Jr. | 315/297 |

* cited by examiner

LOAD DRIVING APPARATUS RELATED TO LIGHT EMITTING DIODES

CROSS-REFERENCE TO RELATED APPLICATION

This application claims the priority benefit of Taiwan application serial no. 101142870, filed on Nov. 16, 2012. The entirety of the above-mentioned patent application is hereby incorporated by reference herein and made a part of this specification.

BACKGROUND OF THE INVENTION

1. Field of the Invention

The present invention generally relates to a capacitive loading driving technique, and more particularly, to a load driving apparatus related to light emitting diodes (LEDs).

2. Description of Related Art

Along with the development of semiconductor technology, the luminosity and luminous efficiency of light emitting diode (LED) have been continuously increased. LED is a new-generation cold light source which offers long lifespan, small volume, low power consumption, low pollution, high reliability, and high adaptability to mass production. Besides, LED can be applied to many different fields, such as to illumination apparatuses, liquid crystal displays (LCD), and backlight sources of billboards, etc.

A LED driving apparatus for driving LEDs is usually a pulse-width-modulation-based (PWM-based) power conversion circuit, such as a boost circuit. However, usually no protection measure/scheme regarding short circuit of LED string is set up in an existing LED driving apparatus. As a result, some critical parts (for example, a control chip) in the LED driving apparatus may be damaged.

SUMMARY OF THE INVENTION

Accordingly, an embodiment of the present invention provides a load driving apparatus. The load driving apparatus includes a power conversion circuit, a complex function circuit, and a control chip. The power conversion circuit receives a DC input voltage and provides a DC output voltage to at least one light emitting diode (LED) string in response to a gate pulse-width-modulation (PWM) signal. The complex function circuit is serially connected with the LED string. The complex function circuit provides a short-protection mechanism. The control chip is coupled to the power conversion circuit and the complex function circuit. The control chip generates the gate PWM signal to control the operation of the power conversion circuit, and when the LED string is short-circuited, the control chip controls the complex function circuit to activate the short-protection mechanism, so as to protect the load driving apparatus from being damaged.

According to an exemplary embodiment of the present invention, the complex function circuit provides a feedback voltage related to a current flowing through the LED string in response to a short detection signal from the control chip. The control chip receives the feedback voltage and determines whether the LED string is short-circuited in response to a comparison between the feedback voltage and a predetermined short reference voltage. When the control chip determines that the LED string is short-circuited, the control chip provides a short-projection signal to the complex function circuit to control the complex function circuit to activate the short-protection mechanism.

According to an exemplary embodiment of the present invention, when the feedback voltage is greater than the predetermined short reference voltage, the LED string is determined to be short-circuited. Contrarily, when the feedback voltage is smaller than the predetermined short reference voltage, the LED string is determined to be normal.

According to an exemplary embodiment of the present invention, the power conversion circuit is a DC boost circuit, and the DC boost circuit includes an inductor, a rectification diode, a filter capacitor, a power switch, and a first current sense resistor. The first end of the inductor receives the DC input voltage. The anode of the rectification diode is coupled to the second end of the inductor, and the cathode of the rectification diode is coupled to the anode of the LED string to provide the DC output voltage. The first end of the filter capacitor is coupled to the cathode of the rectification diode, and the second end of the filter capacitor is coupled to a ground potential. The drain of the power switch is coupled to the second end of the inductor and the anode of the rectification diode, and the gate of the power switch receives the gate PWM signal. The first current sense resistor is coupled between the source of the power switch and the ground potential.

According to an exemplary embodiment of the present invention, the complex function circuit includes a complex function switch and a second current sense resistor. The drain of the complex function switch is coupled to the cathode of the LED string, the source of the complex function switch provides the feedback voltage, and the gate of the complex function switch receives the short detection signal or the short-projection signal. The second current sense resistor is coupled between the source of the complex function switch and the ground potential.

According to an exemplary embodiment of the present invention, the control chip has a feedback pin, and the control chip receives the feedback voltage through the feedback pin. Accordingly, the load driving apparatus includes a Zener diode. The cathode of the Zener diode is coupled to the feedback pin, and the anode of the Zener diode is coupled to the ground potential. The Zener diode is disposed inside or outside the control chip.

According to an exemplary embodiment of the present invention, the control chip has a complex output pin coupled to the gate of the complex function switch. Accordingly, when the LED string is normal, the control chip provides the short detection signal to the gate of the complex function switch through the complex output pin. Additionally, when the LED string is short-circuited, the control chip provides the short-projection signal to the gate of the complex function switch through the complex output pin.

According to an exemplary embodiment of the present invention, the control chip has a gate output pin, and the control chip outputs the gate PWM signal through the gate output pin to control the on/off of the power switch.

According to an exemplary embodiment of the present invention, the control chip has a complex input pin. Accordingly, the control chip generates a dimming output PWM signal in response to a dimming input PWM signal input to the complex input pin and outputs the dimming output PWM signal to the gate of the complex function switch through the complex output pin to control the on/off of the complex function switch.

According to an exemplary embodiment of the present invention, the complex function circuit provides a dimming mechanism and activates the dimming mechanism in response to the dimming output PWM signal to adjust the brightness of the LED string.

According to an exemplary embodiment of the present invention, when the dimming input PWM signal is enabled, the control chip outputs the gate PWM signal to control the on/off of the power switch. Contrarily, when the dimming input PWM signal is disabled, the control chip stops outputting the gate PWM signal to stop controlling the on/off of the power switch.

According to an exemplary embodiment of the present invention, the control chip has a compensation pin. Accordingly, the load driving apparatus includes two compensation capacitors. One of the two compensation capacitors is coupled between the feedback pin and the compensation pin, and the other one of the two compensation capacitors is coupled between the feedback pin and the ground potential. The two compensation capacitors stabilize the gate PWM signal and accordingly the DC output voltage provided by the power conversion circuit.

According to an exemplary embodiment of the present invention, the control chip determines whether to activate an over-current (OC) protection mechanism in response to the voltage across the first current sense resistor and a predetermined OC reference voltage. Accordingly, the control chip stops generating the gate PWM signal in response to the activation of the OC protection mechanism. Besides, the control chip has a current sense pin, and the control chip receives the voltage across the first current sense resistor through the current sense pin.

According to an exemplary embodiment of the present invention, the control chip has a frequency-setting pin. Accordingly, the load driving apparatus includes a frequency-setting resistor coupled between the frequency-setting pin and the ground potential. The frequency-setting resistor sets the frequency of the gate PWM signal.

According to an exemplary embodiment of the present invention, the control chip has a power pin for receiving the DC input voltage. Besides, the control chip has a ground pin coupled to the ground potential.

According to another exemplary embodiment of the present invention, if the control chip does not come with a dimming function, the control chip has a chip enable pin. Accordingly, the complex function circuit is a (specialized) short-protection circuit. When the LED string is short-circuited, the complex function circuit activates the short-protection mechanism and provides a shutdown signal to the chip enable pin. Additionally, when the LED string is short-circuited, the control chip is shut down in response to the shutdown signal from the short-protection circuit. After the fault causing the short circuit is eliminated, the control chip automatically detects the elimination of the short circuit and exits the shutdown state, so that the load driving apparatus needs not to be re-started.

According to an exemplary embodiment of the present invention, if the control chip does not come with the dimming function, the power conversion circuit is a DC boost circuit, and the DC boost circuit includes an inductor, a rectification diode, a filter capacitor, a power switch, and a first current sense resistor. The first end of the inductor receives the DC input voltage. The anode of the rectification diode is coupled to the second end of the inductor, and the cathode of the rectification diode is coupled to the anode of the LED string to provide the DC output voltage. The first end of the filter capacitor is coupled to the cathode of the rectification diode, and the second end of the filter capacitor is coupled to a ground potential. The drain of the power switch is coupled to the second end of the inductor and the anode of the rectification diode, and the gate of the power switch receives the gate PWM signal. The first current sense resistor is coupled between the source of the power switch and the ground potential. The short-protection circuit includes a first switch transistor, a second switch transistor, a second current sense resistor, a first resistor, a second resistor, a third resistor, a capacitor, and a diode. The drain of the first switch transistor is coupled to the cathode of the LED string, the source of the first switch transistor provides a feedback voltage related to a current flowing through the LED string, and the gate of the first switch transistor is coupled to the chip enable pin. The second current sense resistor is coupled between the source of the first switch transistor and the ground potential. The first end of the first resistor is coupled to the drain of the first switch transistor. The gate of the second switch transistor is coupled to the second end of the first resistor, the drain of the second switch transistor is coupled to the gate of the first switch transistor to provide the shutdown signal, and the source of the second switch transistor is coupled to the ground potential. The second resistor is coupled between the drain of the second switch transistor and the ground potential. The capacitor is coupled between the gate of the second switch transistor and the ground potential. The diode is connected with the capacitor in parallel, and the third resistor is connected with the diode in parallel.

As described above, in exemplary embodiments of the present invention, when a LED string is short-circuited, a short-protection mechanism is instantly activated to protect a load driving apparatus from being damaged.

These and other exemplary embodiments, features, aspects, and advantages of the invention will be described and become more apparent from the detailed description of exemplary embodiments when read in conjunction with accompanying drawings.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Reference will now be made in detail to the present preferred embodiments of the invention, examples of which are illustrated in the accompanying drawings. Wherever possible, the same reference numbers are used in the drawings and the description to refer to the same or like parts.

Figure 1:
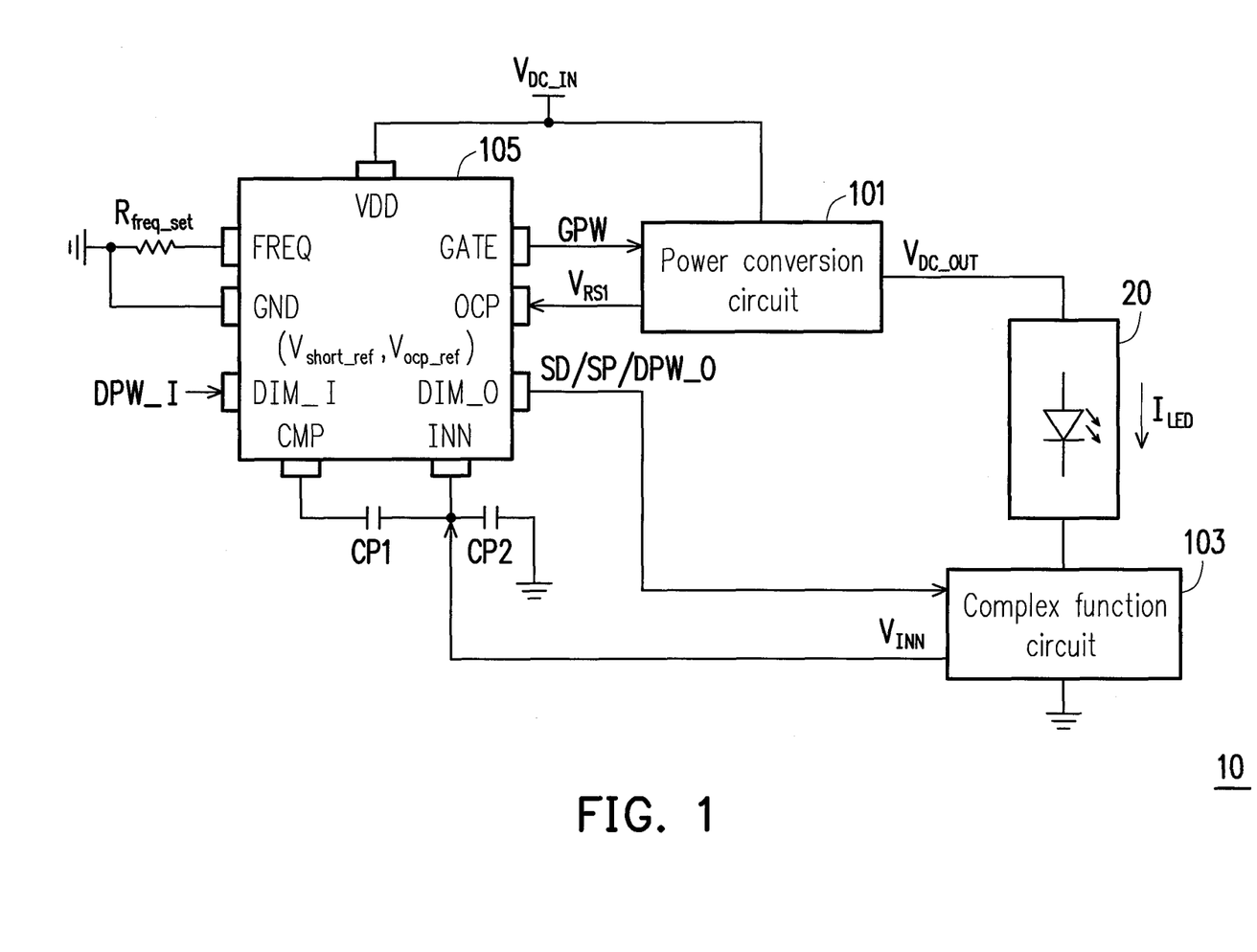
FIG. 1 is a diagram of a load driving apparatus 10 according to an exemplary embodiment of the present invention.

FIG. 1 is a diagram of a load driving apparatus 10 according to an exemplary embodiment of the present invention. Referring to FIG. 1, the load driving apparatus 10 includes a power conversion circuit 101, a complex function circuit 103, a (current-mode) control chip 105, a frequency-setting resistor $R_{freq\_set}$, and compensation capacitors CP1 and CP2. The control chip 105 has a plurality of pins, such as a power pin VDD, a ground pin GND, a complex input pin DIM_I, a complex output pin DIM_O, a gate output pin GATE, a current sense pin OCP, a feedback pin INN, a compensation pin CMP, and a frequency-setting pin FREQ. However, other functional pins can be added to the control chip 105 or an existing functional pin of the control chip 105 can be removed according to the actual design/application requirement.

In order to allow the control chip 105 to work properly, the power pin VDD receives a DC input voltage $V_{DC\_IN}$ required by the operation of the control chip 105, and the ground pin GND is coupled to a ground potential. Accordingly, the control chip 105 can convert (for example, buck/boost) the DC input voltage $V_{DC\_IN}$ to obtain an operating voltage required by the internal circuit(s) of the control chip 105.

In the present exemplary embodiment, the power conversion circuit 101 receives the DC input voltage $V_{DC\_IN}$ and provides a DC output voltage $V_{DC\_OUT}$ to at least an LED string 20 in response to a gate pulse-width-modulation (PWM) signal GPW from the control chip 105. The complex function circuit 103 is serially connected with the LED string 20 and provides a short-protection mechanism. The control chip 105 is coupled to the power conversion circuit 101 and the complex function circuit 103. The control chip 105 generates the gate PWM signal GPW to control the operation of the power conversion circuit 101. Besides, when the LED string 20 is short-circuited, the control chip 105 further controls the complex function circuit 103 to activate the short-protection mechanism, so as to protect the load driving apparatus 10 from being damaged.

Figure 2:
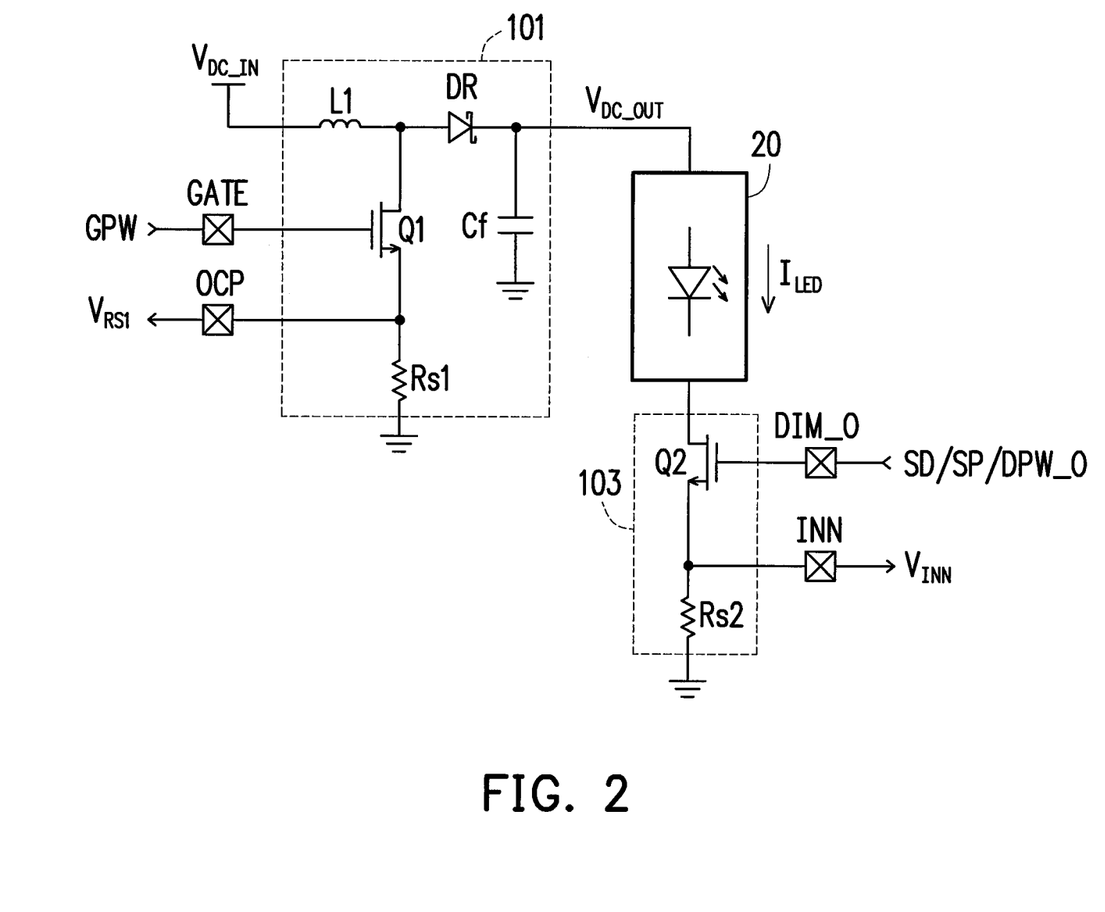
FIG. 2 is a diagram of a power conversion circuit 101 and a complex function circuit 103 in FIG. 1.

To be specific, FIG. 2 is a diagram of the power conversion circuit 101 and the complex function circuit 103 in FIG. 1. Referring to both FIG. 1 and FIG. 2, in the present exemplary embodiment, the power conversion circuit 101 is a DC boost circuit and includes an inductor L1, a rectification diode (for example, a Schottky diode, but not limited thereto) DR, a filter capacitor Cf, a (N-type) power switch Q1, and a current sense resistor Rs1.

The first end of the inductor L1 receives the DC input voltage $V_{DC\_IN}$. The anode of the rectification diode D1 is coupled to the second end of the inductor L1, and the cathode of the rectification diode D1 is coupled to the anode of the LED string 20 to provide the DC output voltage $V_{DC\_OUT}$. The first end of the filter capacitor Cf is coupled to the cathode of the rectification diode D1, and the second end of the filter capacitor Cf is coupled to the ground potential. The drain of the (N-type) power switch Q1 is coupled to the second end of the inductor L1 and the anode of the rectification diode D1, and the gate of the (N-type) power switch Q1 receives the gate PWM signal GPW from the gate output pin GATE of the control chip 105. The current sense resistor Rs1 is coupled between the source of the (N-type) power switch Q1 and the ground potential.

In the present exemplary embodiment, the control chip 105 outputs the gate PWM signal GPW through the gate output pin GATE to control the switching (i.e. on/off) of the power switch Q1. Besides, the control chip 105 further determines whether to activate an over-current (OC) protection mechanism in response to a voltage $V_{Rs1}$ across the current sense resistor Rs1 and a predetermined (or built-in) OC reference voltage $V_{ocp\_ref}$. Once the control chip 105 determines to activate the OC protection mechanism, the control chip 105 stops generating the gate PWM signal GPW in response to the activation of the OC protection mechanism until no OC is detected/happened. In other words, the control chip 105 receives the voltage $V_{Rs1}$ across the current sense resistor Rs1 through the current sense pin OCP and continuously determines whether an OC is detected/happened.

Additionally, to stabilize the gate PWM signal GPW output by the control chip 105 and the DC output voltage $V_{DC\_OUT}$ provided by the power conversion circuit 101, the compensation capacitor CP1 is coupled between the feedback pin INN and the compensation pin CMP, and the compensation capacitor CP2 is coupled between the feedback pin INN and the ground potential. In an actual application, the compensation capacitors CP1 and CP2 stabilize the gate PWM signal GPW output by the control chip 105, so as to accordingly stabilize the DC output voltage $V_{DC\_OUT}$ provided by the power conversion circuit 101. Moreover, to expand the application level/range of the control chip 105, the frequency-setting resistor $R_{freq\_set}$ can be coupled between the frequency-setting pin FREQ and the ground potential for setting the frequency of the gate PWM signal GPW output by the control chip 105. In other words, the frequency of the gate PWM signal GPW output by the control chip 105 varies with the resistance of the frequency-setting resistor $R_{freq\_set}$.

On the other hand, the complex function circuit 103 includes a complex function switch Q2 and a current sense resistor Rs2. The drain of the complex function switch Q2 is coupled to the cathode of the LED string 20, the source of the complex function switch Q2 provides a feedback voltage $V_{INN}$ related to a current $I_{LED}$ flowing through the LED string 20, and the gate of the complex function switch Q2 receives a short detection signal SD or a short-projection signal SP from the complex output pin DIM_O of the control chip 105. The current sense resistor Rs2 is coupled between the source of the complex function switch Q2 and the ground potential.

In the present exemplary embodiment, the complex function circuit 103 provides the feedback voltage $V_{INN}$ related to the current $I_{LED}$ flowing through the LED string 20 in response to the (high-level) short detection signal SD from the complex output pin DIM_O of the control chip 105. Accordingly, the control chip 105 receives the feedback voltage $V_{INN}$ from the complex function circuit 103 through the feedback pin INN and determines whether the LED string 20 is short-circuited in response to the comparison between the feedback voltage $V_{INN}$ and a predetermined (or built-in) short reference voltage $V_{short\_ref}$.

In an actual application, when the LED string 20 is normal and the load driving apparatus 10 operates normally, the feedback voltage $V_{INN}$ provided by the complex function circuit 103 is substantially very small (almost equal to the ground potential, for example, 0.2V, but not limited thereto). However, when the LED string 20 is short-circuited, the feedback voltage $V_{INN}$ provided by the complex function circuit 103 is substantially very large (almost equal to the DC output voltage $V_{DC\_OUT}$ provided by the power conversion circuit 101, for example, from several volts to tens of volts). Thus, in the present exemplary embodiment, when the feedback voltage $V_{INN}$ is greater than the predetermined (or built-in) short reference voltage $V_{short\_ref}$, the LED string 20 is determined to be short-circuited. Contrarily, when the feedback voltage $V_{INN}$ is smaller than the predetermined (or built-in) short reference voltage $V_{short\_ref}$, the LED string 20 is determined to be normal.

When the control chip 105 determines that the LED string 20 is short-circuited (i.e., determines through the feedback pin INN that the feedback voltage $V_{INN}$ provided by the complex function circuit 103 increases abnormally), the control chip 105 provides the (low-level) short-projection signal SP to the complex function circuit 103 through the complex output pin DIM_O to control the complex function circuit 103 to activate the short-protection mechanism, so as to protect the load driving apparatus 10 from being damaged by the large current or large voltage caused by the short-circuited LED string 20.

Thereby, when the LED string 20 is normal, the control chip 105 provides the (high-level) short detection signal SD to the gate of the complex function switch Q2 through the complex output pin DIM_O to turn on the complex function switch Q2. Meanwhile, the control chip 105 continuously receives the feedback voltage V from the complex function circuit 103 through the feedback pin INN and determines whether the feedback voltage $V_{INN}$ is greater than the predetermined (or built-in) short reference voltage $V_{short\_ref}$. Once the control chip 105 determines that the feedback voltage $V_{INN}$ provided by the complex function circuit 103 is greater than the predetermined (or built-in) short reference voltage $V_{short\_ref}$, the control chip 105 determines that the LED string 20 is short-circuited. In this case, the control chip 105 provides the (low-level) short-projection signal SP to the gate of the complex function switch Q2 through the complex output pin DIM_O to turn off the complex function switch Q2, so as to control the complex function circuit 103 to activate the short-protection mechanism and protect the load driving apparatus 10.

Figure 3A:
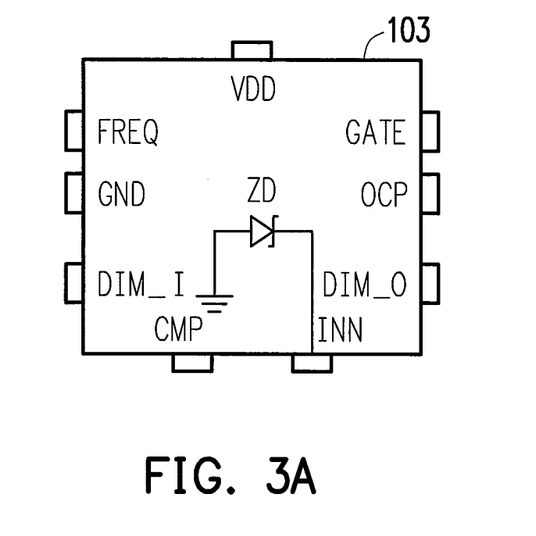
FIG. 3A is a diagram illustrating how a control chip 105 is protected from being damaged by a large short-circuit current and a large short-circuit voltage according to an exemplary embodiment of the present invention.
Figure 3B:
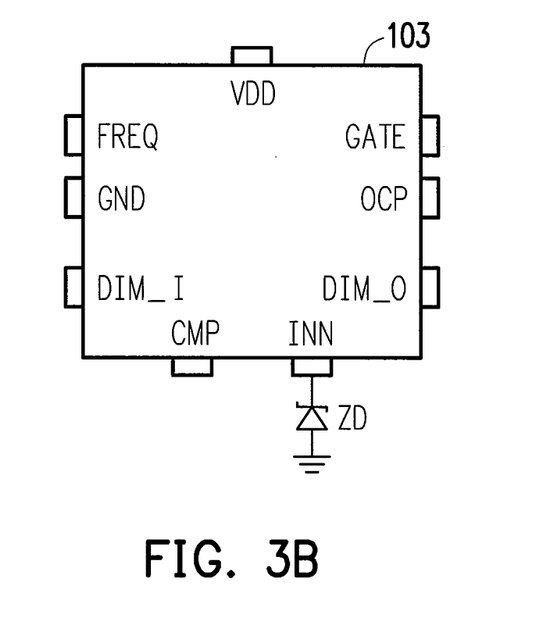
FIG. 3B is a diagram illustrating how a control chip 105 is protected from being damaged by a large short-circuit current and a large short-circuit voltage according to another exemplary embodiment of the present invention.

It should be mentioned herein that when the LED string 20 is short-circuited, the feedback voltage $V_{INN}$ provided by the complex function circuit 103 increases abnormally to the DC output voltage $V_{DC\_OUT}$ of a relatively high level. Accordingly, the control chip 105 may be damaged by the feedback voltage $V_{INN}$ (=$V_{DC\_OUT}$) at a relatively high level. To avoid such a situation, as shown in FIG. 3A and FIG. 3B, the load driving apparatus 10 further includes a Zener diode ZD. The cathode of the Zener diode ZD is coupled to the feedback pin INN, and the anode of the Zener diode ZD is coupled to the ground potential. Besides, in an actual application/design, the Zener diode ZD may be disposed inside (as shown in FIG. 3A) or outside (as shown in FIG. 3B) the control chip 105.

On the other hand, in the present exemplary embodiment, the control chip 105 further offers a dimming function. To be specific, the control chip 105 generates a dimming output PWM signal DPW_O in response to a dimming input PWM signal DPW_I input (from outside) to the complex input pin DIM_I and outputs the dimming output PWM signal DPW_O to the gate of the complex function switch Q2 through the complex output pin DIM_O, so as to control the switching (on/off) of the complex function switch Q2. Accordingly, the complex function circuit 103 further provides a dimming mechanism and activates the dimming mechanism in response to the dimming output PWM signal DPW_O from the control chip 105 to adjust the brightness of the LED string 20.

In an actual application, when the dimming input PWM signal DIM_I is enabled, the control chip 105 outputs the gate PWM signal GPW to control the switching (on/off) of the power switch Q1. Contrarily, when the dimming input PWM signal DIM_I is disabled, the control chip 105 stops outputting the gate PWM signal GPW to stop controlling the switching (on/off) of the power switch Q1. Additionally, in the present exemplary embodiment, the control chip 105 is shut down in response to a shutdown signal (i.e., a signal remaining at a low level) received (from outside) through the complex input pin DIM_I.

As described above, when the LED string 20 is short-circuited, the control chip 105 instantly outputs the short-projection signal SP through the complex output pin DIM_O to turn off the complex function switch Q2 in the complex function circuit 103. Accordingly, the complex function circuit 103 activates the short-protection mechanism to protect the load driving apparatus 10 from being damaged by the large current or large voltage caused by the short-circuited LED string 20.

Figure 4:
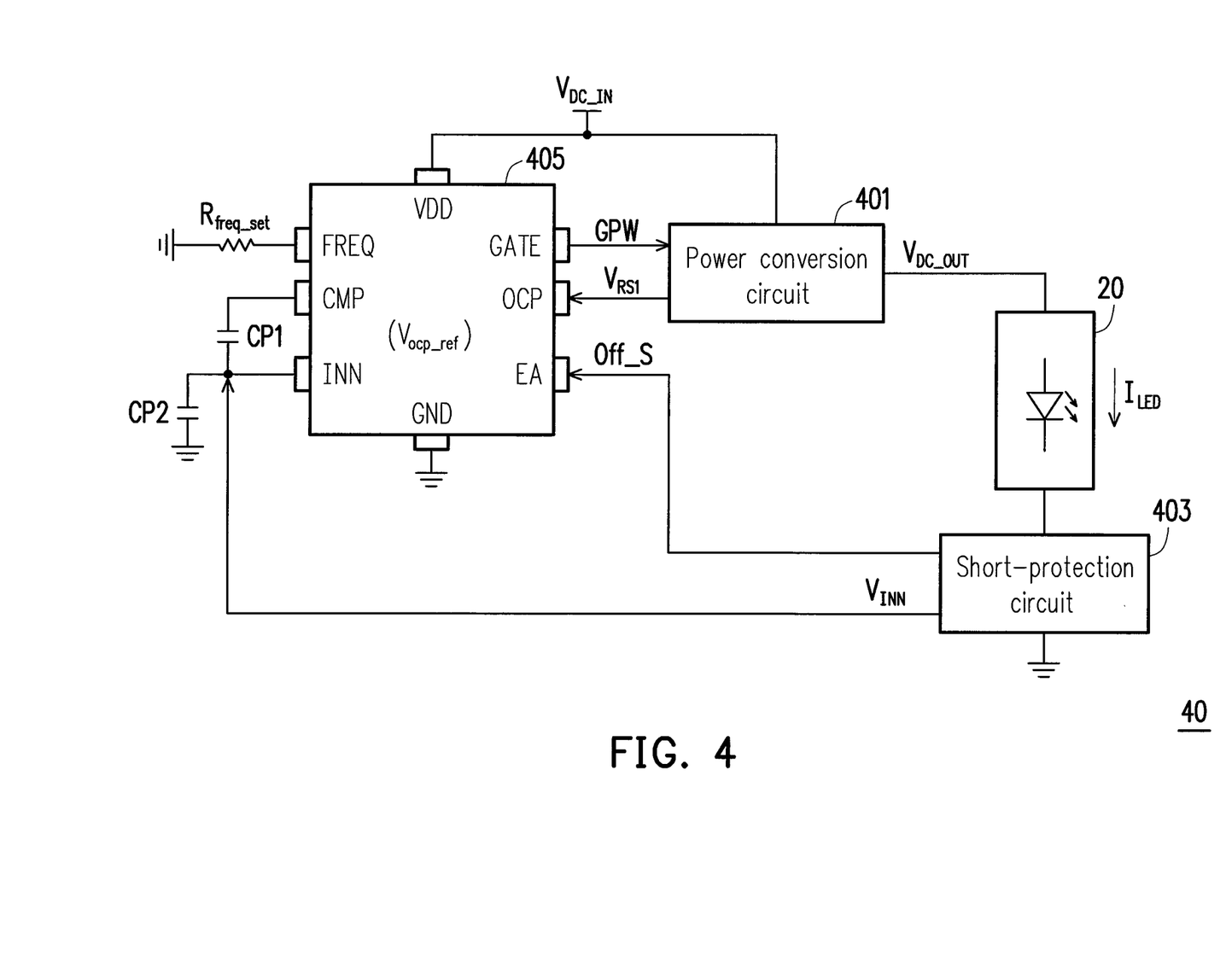
FIG. 4 is a diagram of a load driving apparatus 40 according to another exemplary embodiment of the present invention.

FIG. 4 is a diagram of a load driving apparatus 40 according to another exemplary embodiment of the present invention. Referring to FIG. 4, the load driving apparatus 40 includes a power conversion circuit 401, a short-protection circuit 403, a (current-mode) control chip 405, a frequency-setting resistor $R_{freq\_set}$, and compensation capacitors CP1 and CP2. The control chip 405 has a plurality of pins, such as a power pin VDD, a ground pin GND, a chip enable pin EA, a gate output pin GATE, a current sense pin OCP, a feedback pin INN, a compensation pin CMP, and a frequency-setting pin FREQ. However, other functional pins can be added to the control chip 405 or an existing functional pin of the control chip 405 can be removed according to the actual design/application requirement. Besides, in the present exemplary embodiment, the control chip 405 does not offer a dimming function.

Similarly, in order to allow the control chip 405 to work properly, the power pin VDD receives a DC input voltage $V_{DC\_IN}$ required by the operation of the control chip 405, and the ground pin GND is coupled to the ground potential. Accordingly, the control chip 405 can convert (for example, buck/boost) the DC input voltage $V_{DC\_IN}$ to obtain an operating voltage required by the internal circuit(s) of the control chip 405.

In the present exemplary embodiment, power conversion circuit 401 receives the DC input voltage $V_{DC\_IN}$ and provides a DC output voltage $V_{DC\_OUT}$ to at least an LED string 20 in response to a gate PWM signal GPW from the control chip 405. The short-protection circuit 403 is serially connected with the LED string 20. The short-protection circuit 403 provides a short-protection mechanism, and when the LED string 20 is short-circuited, the short-protection circuit 403 activates the short-protection mechanism to provide a shutdown signal Off_S to the chip enable pin EA. Besides, the control chip 405 is coupled to the power conversion circuit 401 and the short-protection circuit 403. The control chip 405 generates the gate PWM signal GPW to control the operation of the power conversion circuit 401. Moreover, when the LED string 20 is short-circuited, the control chip 405 is shut down in response to the shutdown signal Off_S from the short-protection circuit 403, so that the load driving apparatus 40 is protected from being damaged.

Figure 5:
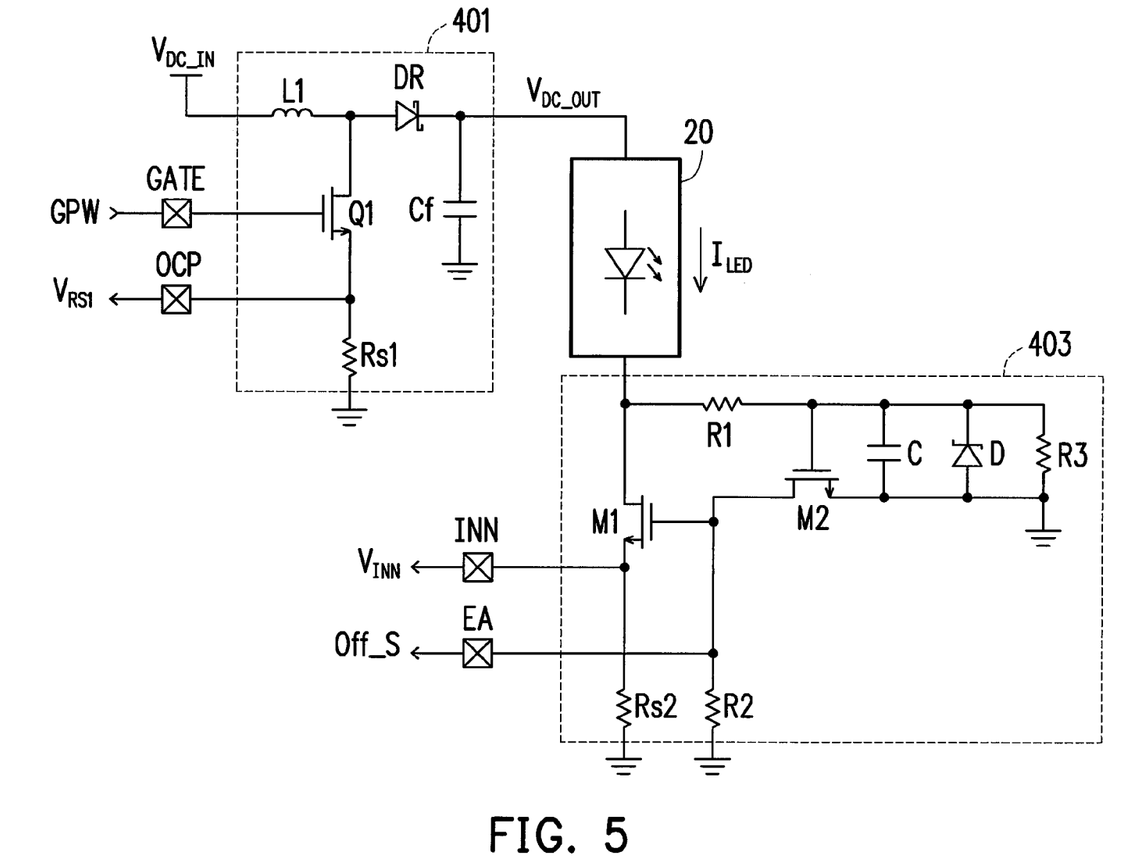
FIG. 5 is a diagram of a power conversion circuit 401 and a short-protection circuit 403 in FIG. 4.

FIG. 5 is a diagram of the power conversion circuit 401 and the short-protection circuit 403 in FIG. 4. Referring to both FIG. 4 and FIG. 5, in the present exemplary embodiment, the power conversion circuit 401 is a DC boost circuit, and similar to the power conversion circuit 101, the power conversion circuit 401 includes an inductor L1, a rectification diode (for example, a Schottky diode, but not limited thereto) DR, a filter capacitor Cf, a (N-type) power switch Q1, and a current sense resistor Rs1.

Similar to that described in foregoing exemplary embodiment, the first end of the inductor L1 receives the DC input voltage $V_{DC\_IN}$. The anode of the rectification diode D1 is coupled to the second end of the inductor L1, and the cathode of the rectification diode D1 is coupled to the anode of the LED string 20 to provide the DC output voltage $V_{DC\_OUT}$. The first end of the filter capacitor Cf is coupled to the cathode of the rectification diode D1, and the second end of the filter capacitor Cf is coupled to the ground potential. The drain of the (N-type) power switch Q1 is coupled to the second end of the inductor L1 and the anode of the rectification diode D1, and the gate of the (N-type) power switch Q1 receives the gate PWM signal GPW from the gate output pin GATE of the control chip 405. The current sense resistor Rs1 is coupled between the source of the (N-type) power switch Q1 and the ground potential.

Similar to that described in foregoing exemplary embodiment, the control chip 405 outputs the gate PWM signal GPW through the gate output pin GATE to control the on/off of the power switch Q1. In addition, the control chip 405 further determines whether to activate an OC protection mechanism in response to a voltage $V_{Rs1}$ across the current sense resistor Rs1 and a predetermined (or built-in) OC reference voltage $V_{ocp\_ref}$. Once the control chip 405 determines to activate the OC protection mechanism, the control chip 405 stops generating the gate PWM signal GPW in response to the activation of the OC protection mechanism until no OC is detected/happened. In other words, the control chip 405 receives the voltage $V_{Rs1}$ across the current sense resistor Rs1 through the current sense pin OCP and continuously determines whether an OC is detected/happened.

Additionally, to stabilize the gate PWM signal GPW output by the control chip 405 and the DC output voltage $V_{DC\_OUT}$ provided by the power conversion circuit 401, the compensation capacitor CP1 is coupled between the feedback pin INN and the compensation pin CMP, and the compensation capacitor CP2 is coupled between the feedback pin INN and the ground potential. In an actual application, the compensation capacitors CP1 and CP2 stabilize the gate PWM signal GPW output by the control chip 405 and accordingly the DC output voltage $V_{DC\_OUT}$ provided by the power conversion circuit 401. Moreover, to expand the application level/range of the control chip 405, the frequency-setting resistor $R_{freq-set}$ can be coupled between the frequency-setting pin FREQ and the ground potential to set the frequency of the gate PWM signal GPW output by the control chip 405. In other words, the frequency of the gate PWM signal GPW output by the control chip 405 changes with the resistance of the frequency-setting resistor $R_{freq\_set}$.

On the other hand, the short-protection circuit 403 includes (N-type) switch transistors M1 and M2, a current sense resistor Rs2, resistors R1, R2, and R3, a capacitor C, and a diode D. The drain of the (N-type) switch transistor M1 is coupled to the cathode of the LED string 20, the source of the (N-type) switch transistor M1 provides a feedback voltage $V_{INN}$ related to a current $I_{LED}$ flowing through the LED string 20 to the feedback pin INN of the control chip 405 (i.e., the control chip 405 receives the feedback voltage $V_{INN}$ through the feedback pin INN), and the gate of the (N-type) switch transistor M1 is coupled to the chip enable pin EA. The current sense resistor Rs2 is coupled between the source of the (N-type) switch transistor M1 and the ground potential.

The first end of the resistor R1 is coupled to the drain of the (N-type) switch transistor M1. The gate of the (N-type) switch transistor M2 is coupled to the second end of the resistor R1, the drain of the (N-type) switch transistor M2 is coupled to the gate of the (N-type) switch transistor M1 to provide the shutdown signal Off_S, and the source of the (N-type) switch transistor M2 is coupled to the ground potential. The resistor R2 is coupled between the drain of the (N-type) switch transistor M2 and the ground potential. The capacitor C is coupled between the gate of the (N-type) switch transistor M2 and the ground potential. The diode D is connected with the capacitor C in parallel, and the resistor R3 is connected with the diode D in parallel.

In an actual application, when the LED string 20 is normal and a signal remaining at a high level is already supplied to the chip enable pin EA to allow the load driving apparatus 40 to operate normally, the feedback voltage $V_{INN}$ provided by the short-protection circuit 403 is substantially very small (almost equal to the ground potential, for example, 0.2V, but not limited thereto). Accordingly, the (N-type) switch transistor M2 is turned off.

Contrarily, when the LED string 20 is short-circuited, the feedback voltage $V_{INN}$ provided by the short-protection circuit 403 is substantially very large (almost equal to the DC output voltage $V_{DC\_OUT}$ provided by the power conversion circuit 401, for example, from several volts to tens of volts). In this case, the (N-type) switch transistor M2 is turned on, so that the (N-type) switch transistor M1 is turned off, and the (low-level) shutdown signal Off_S is provided to the chip enable pin EA of the control chip 405. Accordingly, when the LED string 20 is short-circuited, the control chip 405 is shut down in response to the shutdown signal Off_S from the short-protection circuit 403, so that the load driving apparatus 40 is protected from being damaged. After the fault causing the short circuit of the LED string 20 is eliminated, the drain voltage of the (N-type) switch transistor M1 decreases, so that the (N-type) switch transistor M2 is turned off, the voltage on the resistor R2 increases, and the level of the shutdown signal Off_S also increases. Thus, the control chip 405 automatically exits the shutdown state so that the load driving apparatus 40 needs not to be re-started (or reset).

It should be mentioned that when the LED string 20 is short-circuited, the speed of the (low-level) shutdown signal Off_S provided by the short-protection circuit 403 depends on the resistor R1 and the capacitor C. In other words, when the LED string 20 is short-circuited, the speed of the (low-level) shutdown signal Off_S provided by the short-protection circuit 403 is determined by the resistor R1 and the capacitor C. Thus, in an actual application, the resistor R1 and the capacitor C need to be appropriately/carefully designed.

As described above, when the LED string 20 is short-circuited, the short-protection circuit 403 instantly activates a short-protection mechanism (i.e., turns off the (N-type) switch transistor M1) and provides the shutdown signal Off_S to the chip enable pin EA. Accordingly, when the LED string 20 is short-circuited, the control chip 405 is shut down in response to the shutdown signal Off_S from the short-protection circuit 403, so that the load driving apparatus 40 is protected from being damaged by the large current or large voltage caused by the short-circuited LED string 20.

Figure 6:
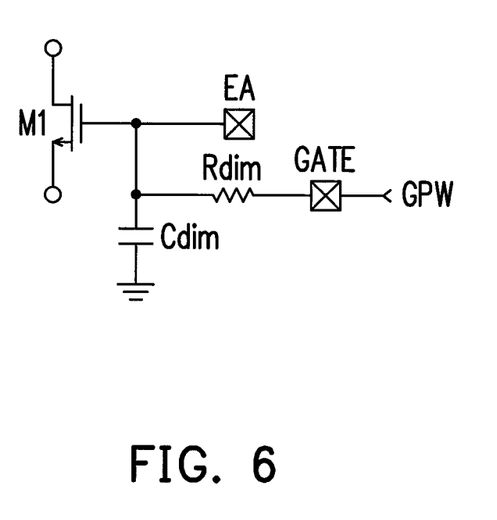
FIG. 6 is a diagram illustrating how a dimming function is realized in the load driving apparatus 40 in FIG. 4.

In the exemplary embodiments illustrated in FIG. 4 and FIG. 5, even though the control chip 405 itself does not offer the dimming function, the dimming function can be realized in the load driving apparatus 40 by adding a RC network (for example, the resistor Rdim and the capacitor Cdim in FIG. 6) in the load driving apparatus 40. The first end of the resistor Rdim receives the gate PWM signal GPW from the control chip 405, and the second end of the resistor Rdim is coupled to the gate of the (N-type) switch transistor M1. Besides, the capacitor Cdim is coupled between the second end of the resistor Rdim and the ground potential. Thus, a dimming function is realized in the load driving apparatus 40.

As described above, in exemplary embodiments of the present invention, when the LED string 20 is short-circuited, a short-protection mechanism is instantly activated to protect the load driving apparatus 10/40 from being damaged.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

In addition, any one embodiment of claim of the present invention is not intended to accomplish all aspects, advantages, or features disclosed by the present invention. Moreover, the abstract and title of the present disclosure are only used for searching patent documents but not intended to limit the scope of the present invention.

What is claimed is:

1. A load driving apparatus, comprising: a power conversion circuit, receiving a DC input voltage, and providing a DC output voltage to a light emitting diode (LED) string in response to a gate pulse-width-modulation (PWM) signal; a complex function circuit, serially connected with the LED string, and providing a short-protection mechanism; and a control chip, coupled to the power conversion circuit and the complex function circuit, wherein the control chip is configured to: generate the gate PWM signal to control operation of the power conversion circuit; and control, when the LED string is short-circuited, the complex function circuit to activate the short-protection mechanism, so as to protect the load driving apparatus from being damaged;

wherein the control chip has a chip enable pin, the complex function circuit is a short-protection circuit, and when the LED string is short-circuited, the complex function circuit activates the short-protection mechanism to provide a shutdown signal to the chip enable pin, when the LED string is short-circuited, the control chip is shut down in response to the shutdown signal from the short-protection circuit, the short-protection circuit comprises: a first switch transistor, having a drain coupled to a cathode of the LED string, having a source for providing a feedback voltage related to a current flowing through the LED string, and having a gate coupled to the chip enable pin; a second current sense resistor, coupled between the source of the first switch transistor and the ground potential; a first resistor, having a first end coupled to the drain of the first switch transistor; a second switch transistor, having a gate coupled to a second end of the first resistor, having a drain coupled to the gate of the first switch transistor for providing the shutdown signal, and having a source coupled to the ground potential; a second resistor, coupled between the drain of the second switch transistor and the ground potential; a capacitor, coupled between the gate of the second switch transistor and the ground potential; a diode, connected with the capacitor in parallel; and a third resistor, connected with the diode in parallel.

2. The load driving apparatus according to claim 1, wherein the complex function circuit provides a feedback voltage related to a current flowing through the LED string in response to a short detection signal from the control chip, the control chip receives the feedback voltage and determines whether the LED string is short-circuited in response to a comparison between the feedback voltage and a predetermined short reference voltage, when the control chip determines that the LED string is short-circuited, the control chip provides a short-projection signal to the complex function circuit, so as to control the complex function circuit to activate the short-protection mechanism.

3. The load driving apparatus according to claim 2, wherein when the feedback voltage is greater than the predetermined short reference voltage, the LED string is short-circuited; and when the feedback voltage is smaller than the predetermined short reference voltage, the LED string is normal.

4. The load driving apparatus according to claim 3, wherein the power conversion circuit is at least a DC boost circuit, and the DC boost circuit comprises:

an inductor, having a first end for receiving the DC input voltage;

a rectification diode, having an anode coupled to a second end of the inductor, and having a cathode coupled to an anode of the LED string for providing the DC output voltage;

a filter capacitor, having a first end coupled to the cathode of the rectification diode, and having a second end coupled to a ground potential;

a power switch, having a drain coupled to the second end of the inductor and the anode of the rectification diode, and having a gate for receiving the gate PWM signal; and a first current sense resistor, coupled between a source of the power switch and the ground potential.

5. The load driving apparatus according to claim 4, wherein the complex function circuit comprises:

a complex function switch, having a drain coupled to a cathode of the LED string, having a source for providing the feedback voltage, and having a gate for receiving the short detection signal or the short-projection signal; and a second current sense resistor, coupled between the source of the complex function switch and the ground potential.

6. The load driving apparatus according to claim 5, wherein the control chip has a feedback pin, and the control chip receives the feedback voltage through the feedback pin.

7. The load driving apparatus according to claim 6 further comprising:

a Zener diode, having a cathode coupled to the feedback pin, and having an anode coupled to the ground potential.

8. The load driving apparatus according to claim 7, wherein the Zener diode is disposed inside or outside the control chip.

9. The load driving apparatus according to claim 6, wherein the control chip further has a complex output pin coupled to the gate of the complex function switch.

10. The load driving apparatus according to claim 9, wherein when the LED string is normal, the control chip provides the short detection signal to the gate of the complex function switch through the complex output pin, when the LED string is short-circuited, the control chip provides the short-projection signal to the gate of the complex function switch through the complex output pin.

11. The load driving apparatus according to claim 10, wherein the control chip further has a gate output pin, and the control chip outputs the gate PWM signal through the gate output pin to control a switching of the power switch.

12. The load driving apparatus according to claim 11, wherein the control chip further has a complex input pin, the control chip generates a dimming output PWM signal in response to a dimming input PWM signal input to the complex input pin and outputs the dimming output PWM signal to the gate of the complex function switch through the complex output pin to control the switching of the complex function switch.

13. The load driving apparatus according to claim 12, wherein the complex function circuit provides a dimming mechanism and activates the dimming mechanism in response to the dimming output PWM signal, so as to adjust a brightness of the LED string.

14. The load driving apparatus according to claim 12, wherein
when the dimming input PWM signal is enabled, the control chip outputs the gate PWM signal to control the switching of the power switch; and
when the dimming input PWM signal is disabled, the control chip stops outputting the gate PWM signal to stop controlling the swtiching of the power switch.

15. The load driving apparatus according to claim 12, wherein the control chip further has a compensation pin, and the load driving apparatus further comprises two compensation capacitors, one of the two compensation capacitors is coupled between the feedback pin and the compensation pin, and the other one of the two compensation capacitors is coupled between the feedback pin and the ground potential,
wherein the two compensation capacitors stabilize the gate PWM signal, so as to accordingly stabilize the DC output voltage provided by the power conversion circuit.

16. The load driving apparatus according to claim 15, wherein
the control chip determines whether to activate an over-current (OC) protection mechanism in response to a voltage across the first current sense resistor and a predetermined OC reference voltage,
the control chip stops generating the gate PWM signal in response to the activation of the OC protection mechanism,
the control chip further has a current sense pin, and the control chip receives the voltage across the first current sense resistor through the current sense pin.

17. The load driving apparatus according to claim 16, wherein the control chip further has a frequency-setting pin, and the load driving apparatus further comprises:
a frequency-setting resistor, coupled between the frequency-setting pin and the ground potential, and configured to set a frequency of the gate PWM signal.

18. The load driving apparatus according to claim 17, wherein
the control chip further has a power pin for receiving the DC input voltage required by the operation of the control chip,
the control chip further has a ground pin coupled to the ground potential.

19. The load driving apparatus according to claim 1 wherein the power conversion circuit is at least a DC boost circuit, and the DC boost circuit comprises: an inductor, having a first end for receiving the DC input voltage; a rectification diode, having an anode coupled to a second end of the inductor, and having a cathode coupled to an anode of the LED string for providing the DC output voltage; a filter capacitor, having a first end coupled to the cathode of the rectification diode, and having a second end coupled to a ground potential; a power switch, having a drain coupled to the second end of the inductor and the anode of the rectification diode, and having a gate for receiving the gate PWM signal; and a first current sense resistor, coupled between a source of the power switch and the ground potential.

20. The load driving apparatus according to claim 1, wherein the control chip determines whether to activate an OC protection mechanism in response to a voltage across the first current sense resistor and a predetermined OC reference voltage, the control chip stops generating the gate PWM signal in response to the activation of the OC protection mechanism, the control chip further has a current sense pin, and the control chip receives the voltage across the first current sense resistor through the current sense pin.

21. The load driving apparatus according to claim 20, wherein
the control chip further has a gate output pin, and the control chip outputs the gate PWM signal through the gate output pin to control a switching of the power switch,
the control chip further has a feedback pin, and the control chip receives the feedback voltage through the feedback pin.

22. The load driving apparatus according to claim 21, wherein the control chip further has a compensation pin, and the load driving apparatus further comprises two compensation capacitors, one of the two compensation capacitors is coupled between the feedback pin and the compensation pin, and the other one of the two compensation capacitors is coupled between the feedback pin and the ground potential,
wherein the two compensation capacitors stabilize the gate PWM signal, so as to accordingly stabilize the DC output voltage provided by the power conversion circuit.

23. The load driving apparatus according to claim 22, wherein the control chip further has a frequency-setting pin, and the load driving apparatus further comprises:
a frequency-setting resistor, coupled between the frequency-setting pin and the ground potential, and configured to set a frequency of the gate PWM signal.

24. The load driving apparatus according to claim 23, wherein
the control chip further has a power pin for receiving the DC input voltage required by the operation of the control chip,
the control chip further has a ground pin coupled to the ground potential.

* * * * *